(12) United States Patent
Haladyna

(10) Patent No.: US 7,922,005 B2
(45) Date of Patent: Apr. 12, 2011

(54) REMOVABLE SHIELD IN AN ENGINE OIL STRAINER

(75) Inventor: Ted Haladyna, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1043 days.

(21) Appl. No.: 11/693,398

(22) Filed: Mar. 29, 2007

(65) Prior Publication Data

US 2008/0237111 A1  Oct. 2, 2008

(51) Int. Cl.
*B01D 35/00* (2006.01)
*B01D 35/30* (2006.01)
*B01D 35/28* (2006.01)
*B01D 29/00* (2006.01)

(52) U.S. Cl. ........ 210/445; 210/232; 210/446; 210/236; 210/435; 210/447; 210/453

(58) Field of Classification Search .......... 210/232, 210/445, 446, 236; 220/252, 799, 811, 812, 220/309.2, 345.2; 55/506
See application file for complete search history.

(56) References Cited

U.S. PATENT DOCUMENTS

| 1,296,423 | A | * | 3/1919 | Neef ........................... 220/573.4 |
| 1,641,775 | A | * | 9/1927 | Muenzenmayer ......... 220/345.2 |
| 1,945,824 | A | | 2/1934 | Saxe |
| 2,416,475 | A | | 2/1947 | Friedman |
| 4,056,168 | A | | 11/1977 | Bajohr et al. |
| 4,129,503 | A | | 12/1978 | Joseph |
| 4,889,621 | A | | 12/1989 | Yamada et al. |
| 5,074,381 | A | | 12/1991 | Minard et al. |
| 5,589,059 | A | | 12/1996 | Semar |
| 6,033,455 | A | * | 3/2000 | Kurashima ...................... 55/497 |
| 6,214,224 | B1 | | 4/2001 | Farley |
| 6,325,930 | B2 | | 12/2001 | Farley |
| 6,523,561 | B2 | | 2/2003 | Kapcoe et al. |
| 7,143,898 | B1 | | 12/2006 | Hoaglin |

FOREIGN PATENT DOCUMENTS

JP  56-106016  8/1981
JP  2003-132617  5/2003

* cited by examiner

*Primary Examiner* — Krishnan S Menon
*Assistant Examiner* — Benjamin Kurtz
(74) *Attorney, Agent, or Firm* — Gifford, Krass, Sprinkle, Anderson & Citkowski, P.C.

(57) ABSTRACT

An oil strainer assembly is used to filter oil in an internal combustion engine of an automotive vehicle. The oil strainer assembly includes a strainer element and a housing. The housing has a first shell and a second shell. The housing has an inlet formed in one of the first and second shells and an inlet formed in the other of the first and second shells. The strainer element is disposed between the first shell and the second shell for filtering debris from oil passing between the inlet and the outlet of the housing. Each of the first and second shells has an outer wall. The first shell having a first flange for retaining the outer wall of the second shell. The first shell further having an outwardly extending tab for retaining a portion of the outer wall of the second shell opposite the first flange. The tab being movable away from the outer wall of the second shell to allow removal of the outer wall of the second shell from the first flange of the first shell along a generally radial direction.

17 Claims, 3 Drawing Sheets

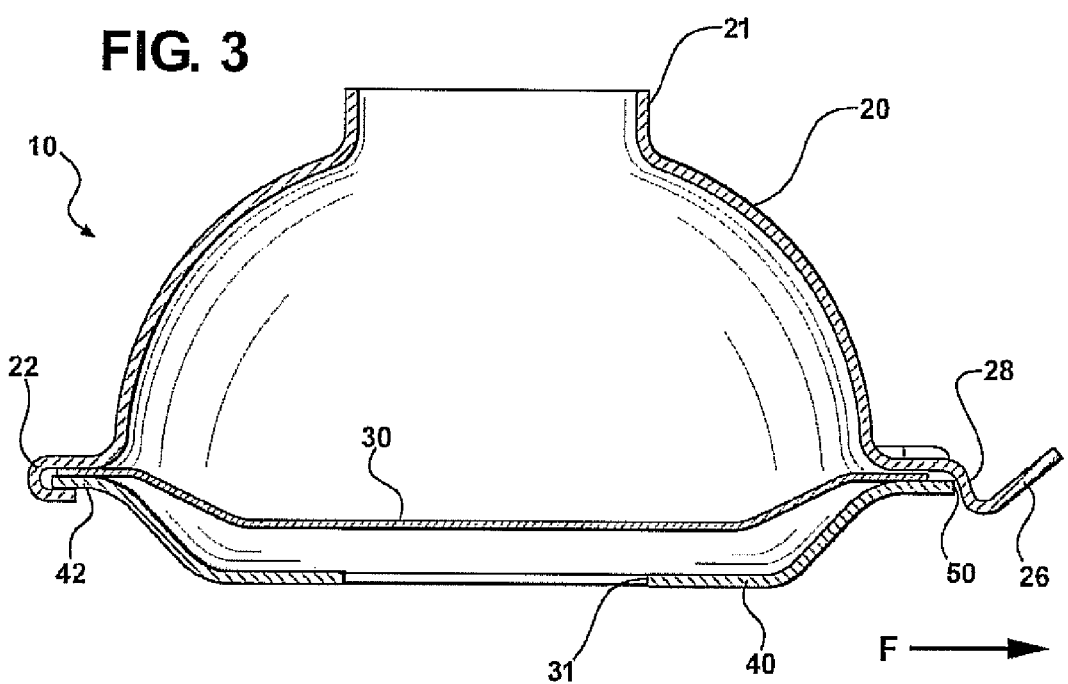
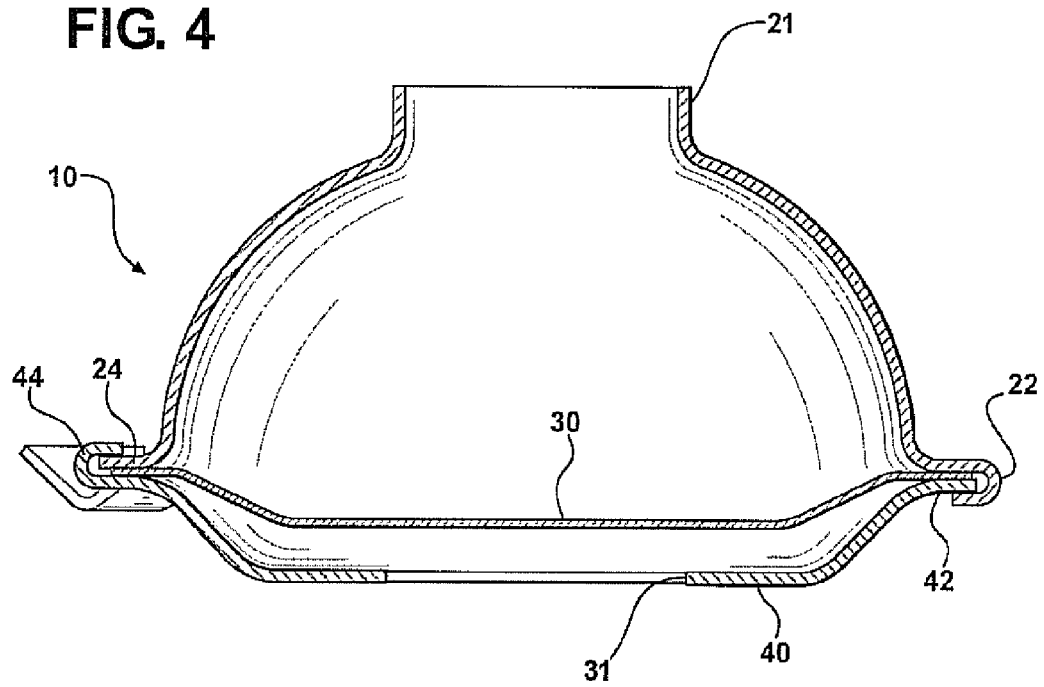

REMOVABLE SHIELD IN AN ENGINE OIL STRAINER

FIELD OF THE INVENTION

The invention relates to oil strainers for automotive vehicle engines. More particularly, the invention relates to an oil strainer assembly having a removable shield for servicing of the oil strainer assembly.

BACKGROUND OF THE INVENTION

Automotive vehicles with internal combustion engines require oil to lubricate high friction areas within engine, such as the crankshaft or the pistons. Particulate or debris, such as metal shavings, gasket material and oil sludge, may damage surfaces in these high friction areas, which can result in reduced engine performance or even premature engine failure. Oil filtrations systems are used to remove the debris from the oil as it is circulated throughout the engine by an oil pump. Oil filtration systems typically include an oil strainer assembly that filters the debris from oil drawn by the oil pump from a sump.

Over time, the oil strainer assembly may become plugged, which reduces the ability of the oil pump to pull oil from the sump. The oil strainer assembly must be removed, cleaned or replaced.

It remains desirable to provide an improved oil strainer assembly design that is easier to remove and service compared to conventional designs.

SUMMARY OF THE INVENTION

According to one aspect of the invention, an oil strainer assembly is provided for filtering oil in an internal combustion engine of an automotive vehicle. The oil strainer assembly includes a strainer element and a housing. The housing has a first shell and a second shell. The housing has an inlet formed in one of the first and second shells and an outlet formed in the other of the first and second shells. The strainer element is disposed between the first shell and the second shell for filtering debris from oil passing between the inlet and the outlet of the housing. Each of the first and second shells has an outer wall. The first shell has a first flange for retaining the outer wall of the second shell. The first shell further has an outwardly extending tab for retaining a portion of the outer wall of the second shell opposite the first flange. The tab is movable away from the outer wall of the second shell to allow removal of the outer wall of the second shell from the first flange of the first shell along a generally radial direction.

BRIEF DESCRIPTION OF THE DRAWINGS

Advantages of the present invention will be readily appreciated as the same becomes better understood by reference to the following detailed description when considered in connection with the accompanying drawings, wherein:

FIG. 3 is a cross sectional view of the oil strainer assembly as taken through line 3-3 indicated in FIG. 1; and FIG. 4 is a cross sectional view of the oil strainer assembly as taken through line 4-4 indicated in FIG. 1.

DETAILED DESCRIPTION OF THE PREFERRED EMBODIMENTS

Figure 1:
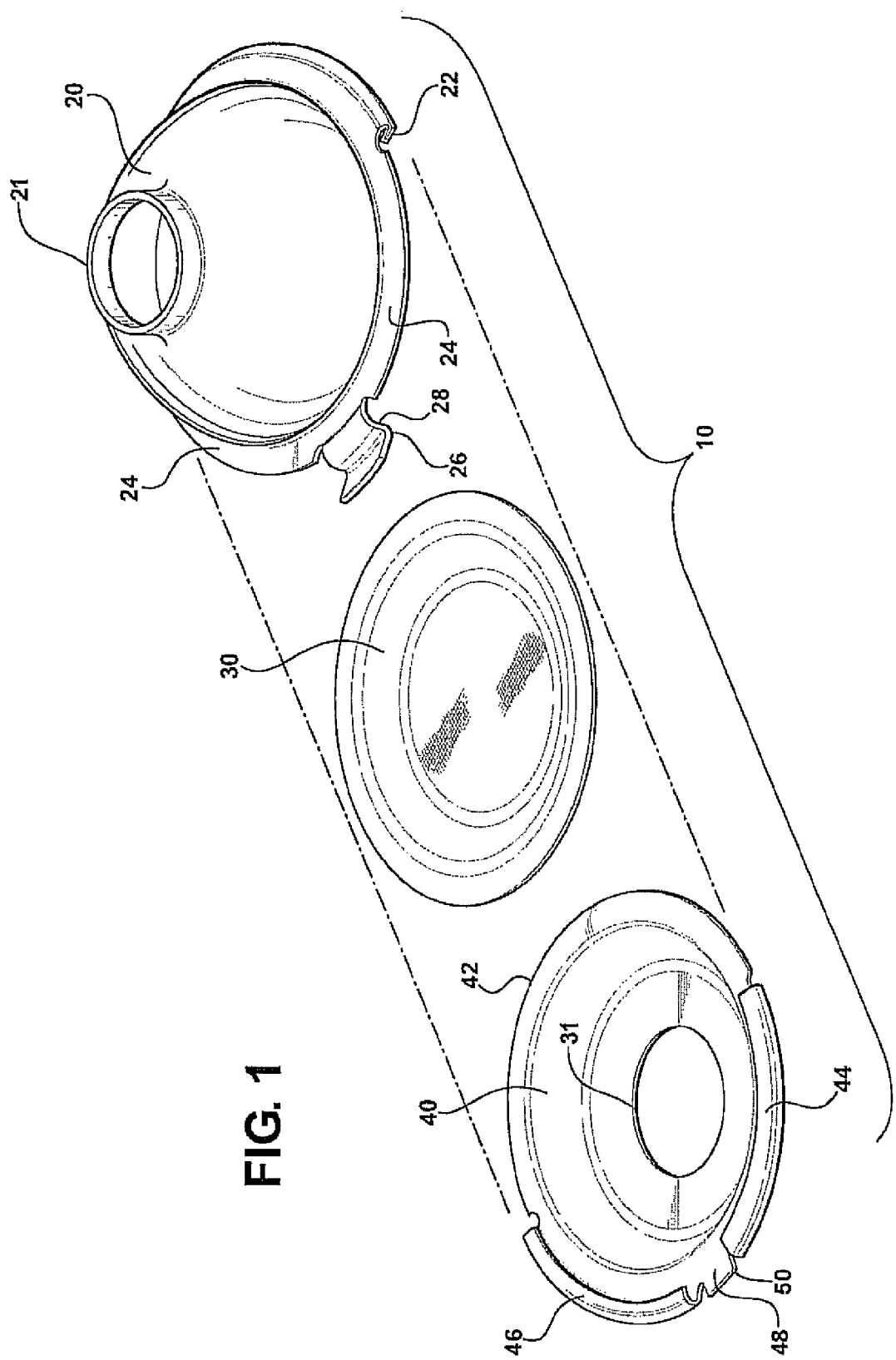
FIG. 1 is an exploded perspective view of an oil strainer assembly according to one embodiment of the invention.
Figure 2:
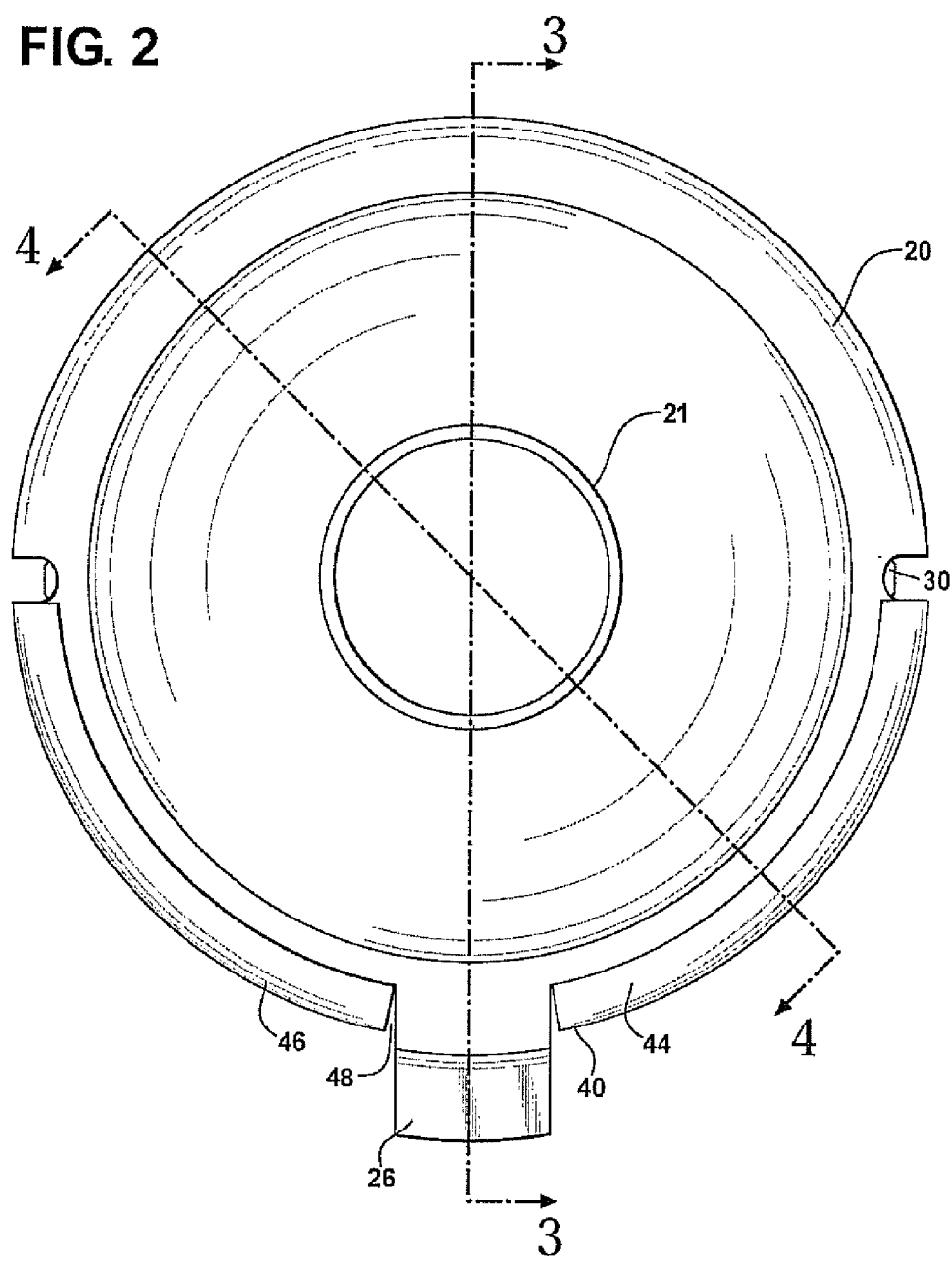
FIG. 2 is a top elevational view of the oil strainer assembly of FIG. 1.

Referring to the figures, an oil strainer assembly for use in an internal combustion engine of an automotive vehicle according to one embodiment of the invention is generally indicated at 10. The oil strainer assembly 10 includes a first shell 20, a strainer mesh or element 30, and a second shell 40. The first shell 20 and second shell 40 can be releasably interconnected to form a housing that supports the strainer element 30 therein. The shells may be formed of any suitable material known by those having ordinary skill in the art, such as metal or molded plastic. Described in greater detail below, the second shell 40 may be separated from the first shell 20 to facilitate cleaning or replacement of the strainer element 30.

The first shell 20 is generally bell shaped and includes an outlet 21 for coupling the oil strainer assembly to an inlet tube of an oil pump (not shown). The outlet 21 formed as an axially extending tube in a central portion of the first shell 20. The first shell 20 further has a generally circular outer perimeter or edge 24. A first hooked flange 22 extends along half or less than half of the outer wall 24 of the first shell 20. A tab 26 extends generally radially outwardly from the outer wall 24 opposite the first hooked flange 22. The tab 26 has a locating wall 28 that extends generally orthogonally from the outer wall 24 of the first shell 20 toward the second shell 40.

The second shell 40 has an inlet 31 for receiving oil from a sump in the engine. The second shell 40 also has a generally circular outer wall 42. A second hooked flange 44 and a third hooked flange 46 are formed along portions of the outer wall 42 for retaining the outer wall 24 of the first shell 24. The second hooked flange 44 and the third hooked flange 46 are spaced apart to define a space or slot 48 for receiving the tab 26 from the first shell 20 therethrough during assembly. An outwardly extending locating edge 50 is disposed in the slot 48 for contacting the locating wall 28 of the tab 26 during assembly of the second shell 40 to the first shell 20. It should be readily appreciated by those having ordinary skill in the art that the tab and flange arrangement shown in the illustrated embodiment may be reversed so that the tab extends from the second shell rather than the first shell. It is also appreciated from the drawings that the first hooked flange 22 extends radially outward and then radially inward from the first shell outer wall in a spaced-apart parallel arrangement and second hooked flange 44 and third hooked flange 46 extend radially outward and then radially inward from the second shell outer wall in a spaced-apart parallel arrangement.

In assembly, the strainer element 30 is held both axially and radially between the first shell 20 and the second shell 40. The outer wall 42 of the second shell 40 is retained in the first hooked flange 22 of the first shell 22. The outer wall 24 of the first shell 24 is retained in both the second hooked flange 44 and the third hooked flange 46. The first hooked flange 22 of the first shell 22 is opposed relative to the second 44 and third 46 flanges of the second shell 40, so that the first 20 and second 40 shells are constrained relative to each other in an axial direction. The first 20 and second 40 shells are also constrained relative to each other along all of radial directions, except for along a radial direction F (FIG. 3). Contact between the locating wall 28 and the locating edge 50, however, constrains the first 20 and second 40 shells along the radial direction F.

In use, the oil strainer assembly 10 is submerged in oil in a sump. The flanged outlet 21 of the first shell 20 is coupled to an inlet tube (not shown) of an oil pump in the engine. As the engine is running, the oil pump sucks oil from the sump through the oil strainer assembly 10. More specifically, oil enters the oil strainer assembly 10 through the inlet 21 of the second shell 40. Debris is filtered from the oil by the strainer element 30 as the oil moves through the strainer element 30. Oil filtered by the strainer element 30 exits the oil strainer assembly 10 through the flanged outlet 21 and is fed to the oil pump. Over time, debris may accumulate on the strainer element 30, thereby reducing or hindering the flow of oil through the strainer element. At this point, the strainer element 30 may need to be removed, and cleaned or replaced.

The strainer element 30 is removed by disassembling the first 20 and second 40 shells. The locating wall 28 of the tab 26 is bent away from the locating wall 28. The second shell 40 is then displacable along the radial direction F (FIG. 3) without interference between the locating wall 28 and locating edge 50. The second shell 40 is displaced along the radial direction F until the edges 24, 42 are no longer retained in the flanges 22, 44, 46. The second shell 40 is then separable from the first shell 20 to access the strainer element 30. The cleaned strainer element or a new strainer element may be reassembled between the first 20 and second shells 40 by reversing the aforementioned steps.

Optionally, gaskets may be provided between the shells to prevent oil from leaking therebetween.

The invention has been described in an illustrative manner. It is, therefore, to be understood that the terminology used is intended to be in the nature of words of description rather than of limitation. Many modifications and variations of the invention are possible in light of the above teachings. For example, the shells described above are generally bell shaped, but may be formed in any suitable shape depending on the packaging constraints of the engine and the desired oil carrying capacity of the oil strainer assembly. As another example, a single flange opposing the tab may be used instead of the three flanges shown in the illustrated embodiment for retaining the shells together. Thus, within the scope of the appended claims, the invention may be practiced other than as specifically described.

I claim:

1. An oil strainer assembly for filtering oil in an internal combustion engine of an automotive vehicle, said oil strainer assembly comprising:
    a strainer element; and
    a housing having a first shell and a second shell, the housing having an inlet formed in one of the first and second shells and an outlet formed in the other of the first and second shells, the strainer element being disposed between the first shell and the second shell for filtering debris from oil passing between the inlet and the outlet of the housing,
    each of the first and second shells having a substantially radially outwardly extending outer wall,
    the first shell having a first hooked flange extending radially outward and then radially inward from the first shell outer wall in a spaced-apart parallel arangement for retaining the outer wall of the second shell, the first shell further having an outwardly extending tab for retaining a portion of the outer wall of the second shell opposite the first hooked flange, the tab being movable away from the outer wall of the second shell to allow removal of the outer wall of the second shell from the first hooked flange of the first shell along a generally radial direction.

2. An oil strainer assembly as set forth in claim 1, wherein the second shell includes a second hooked flange extending radially outward and then radially inward from the second shell outer wall in a spaced-apart parallel arangement for retaining a portion of the outer wall of the first shell, the second hooked flange being on a substantially opposite side of the housing relative to the first flange.

3. An oil strainer assembly as set forth in claim 2, wherein the second shell includes a third hooked flange extending radially outward and then radially inward from the second shell outer wall in a spaced-apart parallel arangement for retaining a portion of the outer wall of the first shell, the third hooked flange being on a substantially opposite side of the housing relative to the first flange.

4. An oil strainer assembly as set forth in claim 3, wherein the second hooked flange and the third hooked flange are spaced apart to receive the tab therebetween.

5. An oil strainer assembly as set forth in claim 4, wherein the tab includes a locating wall that extends generally orthogonally from the outer wall of the first shell to contact a locating edge formed along the outer wall of the second shell.

6. An oil strainer assembly as set forth in claim 1, wherein the first hooked flange extends along half or less than half of the outer wall of the first shell.

7. An oil strainer assembly as set forth in claim 1, wherein the outlet is formed in the first shell.

8. An oil strainer assembly as set forth in claim 7, wherein the inlet is formed in the second shell.

9. An oil strainer assembly as set forth in claim 8, wherein the outlet and inlet are substantially coaxially aligned.

10. An oil strainer assembly as set forth in claim 7, wherein the first shell is generally bell shaped.

11. An oil strainer assembly as set forth in claim 10, wherein the outlet includes an axially extending tube for coupling the housing to an oil pump.

12. An oil strainer assembly as set forth in claim 11, wherein the outer wall of the first shell is generally annular.

13. An oil strainer assembly as set forth in claim 12, wherein the tube of the outlet and the inlet are substantially coaxially aligned.

14. An oil strainer assembly as set forth in claim 1, wherein the strainer element is held between the outer walls of the first and second shells.

15. An oil strainer assembly as set forth in claim 1, wherein the outer wall of the second shell slides within the first hooked flange of the first shell along a generally radial direction.

16. An oil strainer assembly as set forth in claim 2, wherein the outer wall of the first shell slides within the second hooked flange of the second shell along a generally radial direction.

17. An oil strainer assembly as set forth in claim 3, wherein the outer wall of the first shell slides within the third hooked flange of the second shell along a generally radial direction.

* * * * *